United States Patent [19]
Beissbarth

[11] Patent Number: 5,038,485
[45] Date of Patent: Aug. 13, 1991

[54] METHOD AND APPARATUS FOR THE MEASUREMENT OF WHEEL ALIGNMENT

[76] Inventor: Osmond Beissbarth, Sulzbacher Strasse 15, D-8000 Muenchen 40, Fed. Rep. of Germany

[21] Appl. No.: 272,891
[22] PCT Filed: Jun. 12, 1987
[86] PCT No.: PCT/EP87/00307
    § 371 Date: Oct. 7, 1988
    § 102(e) Date: Oct. 7, 1988
[87] PCT Pub. No.: WO88/09913
    PCT Pub. Date: Dec. 15, 1988

[51] Int. Cl.$^5$ .............................. G01B 21/26
[52] U.S. Cl. .................. 33/203.18; 33/336; 33/301
[58] Field of Search ............ 33/203.18, 203, 335, 33/336, 318, 321, 328, 329, 351, 301

[56] References Cited

U.S. PATENT DOCUMENTS

| | | |
|---|---|---|
| 3,892,042 | 7/1975 | Senften ........................ 33/336 X |
| 4,095,902 | 6/1978 | Florer et al. . |
| 4,126,943 | 11/1978 | Senften . |
| 4,151,656 | 5/1979 | Hensley ........................ 33/321 |
| 4,341,021 | 7/1982 | Beissbarth . |
| 4,383,370 | 5/1983 | Van Blerk et al. . |
| 4,458,426 | 7/1984 | O'Conner et al. ............ 33/325 |
| 4,771,546 | 9/1988 | Cavazos ....................... 33/336 |

FOREIGN PATENT DOCUMENTS

| | | |
|---|---|---|
| 3203981 | 8/1983 | Fed. Rep. of Germany ... 33/203.18 |
| 2356122 | 2/1978 | France ........................ 33/203.18 |

OTHER PUBLICATIONS

PCT Application WO81/01047, Applicant: Hunter et al., Filed Oct. 2, 1980.

Primary Examiner—Harry N. Haroian
Attorney, Agent, or Firm—Pearne, Gordon, McCoy & Granger

[57] ABSTRACT

A wheel alignment measurement system includes one single portable angle measurement instrument (10) which is connected to a stationary unit (14) via a line (12). The angle measurement instrument (10) includes a gyroscope unit supported in full cardanic manner and being connected to an angle measurement device. By applying the angle measurement instrument subsequently to each of the wheels of the vehicle to be measured the respective angles between the wheel and a directionally stable axis of the gyroscope unit are measured and are stored in memories (S). Subsequently the desired wheel alignment parameters are calculated by processing the measurement values stored in the memories (s) by means of calculation circuitries (R) and are displayed in the display unit (A).

23 Claims, 5 Drawing Sheets

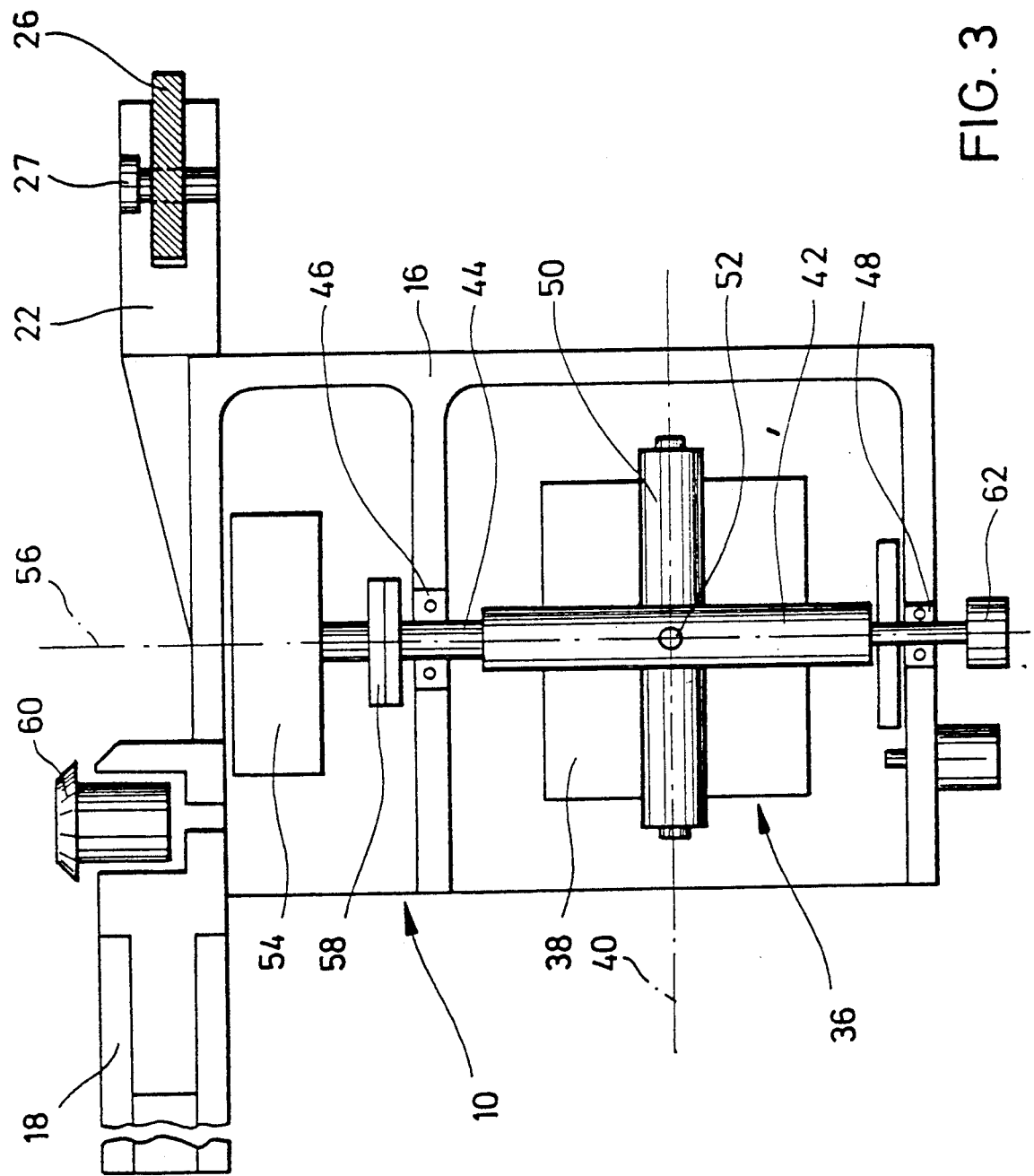

METHOD AND APPARATUS FOR THE MEASUREMENT OF WHEEL ALIGNMENT

The invention relates to a method for measuring wheel alignment, wherein the angle between the wheel and a reference basis is measured for each wheel with the aid of an angle measurement apparatus, an electric output signal corresponding to the respective angle is generated and the wheel alignment parameters to be found are calculated from the output signals.

Also the invention relates to a wheel alignment measurement apparatus, in particular for carrying out the above method by means of an angle measurement arrangement being connectable to the wheels for the purpose of track measurement and generating an electrical angle position output signal for each wheel, and with a calculation circuit for determining track measurement parameters out of the output signals of the angle measurement arrangement.

A method of the above kind and a corresponding wheel alignment measurement apparatus are known from the German patent specification 29 34 411. Thereing total of six angle measurement instruments is provided for; two angle measurement instruments being provided for at the front wheels for measuring the total track angle of the front wheels, two further angle measurement instruments being provided for at the left front wheel and the left rear wheel for measuring the angular positions of these wheels and two further angle measurement instruments being provided for at the right front wheel and the right rear wheel for measuring the angular positions of these wheels. The first two angle measurement instruments therein are rigidly connected to the further angle measurement instruments at the front wheels. The track measurement parameters can be determined on basis of the angular positions from all angle measurement instruments by means of suitable calculation circuitries.

This known wheel alignment measurement system already has the advantage, as compared to the commonly used wheel alignment measurement systems requiring a stationary measurement frame on which the vehicle to be measured is placed, that it is operable without an external reference system, however, the installation of the numerous angle measurement instruments at the individual wheels is troublesome and time-consuming and due to the plurality of angle measurement instruments required the known wheel alignment measurement system is comparatively complex in this respect, too.

As compared thereto, the present invention improves the known method and the known system such that the bulk of equipment required is reduced and the measurement is accelerated and simplified. Simultaneously, however, the local independence of the systems is maintained, i.e. the system still shall do without an external reference system.

The invention provides with respect to the method that an element being directionally stable in space independently of its local position is used as reference basis, that said directionally stable element is subsequently moved from wheel to wheel for measuring the respective angle and that upon every measurement the angle measured for the respective wheel is stored. The reference basis is in a particularly advantageous manner generated by a rotating gyroscope being suspended in a cardanic manner.

In case of the method of the present invention, thus only one single angle measurement instrument is required, wherein subsequently the track angles of the wheels to be measured are measured and thereupon the wheel alignment parameters are calculated on basis of the stored measurement values by suitable calculation circuits. Since the axis of rotation of a rotating gyroscope suspended in a cardanic manner always remains directionally stable in space, the angle measurement instrument may be moved in space in an arbitrary manner between two measurement operations without the direction of the axis of rotation of the gyroscope changing. Thus at every wheel, the angle is measured in relation to a continuously directionally stable axis.

The method according to the present invention permits a particularly simply and quick performance of the measurement operations since it will no longer be necessary to mount several measuring heads at different wheels and to mutually align them.

It is provided in advantageous further development of the method of the present invention that at the beginning of the measurement at first at first the direction of the reference basis is adjusted at one part of the vehicle and thereafter remains unchanged till the end of the measurement. This adjustment may be carried out in particular at a rear wheel, preferably at the left rear wheel, or at another reference basis of the vehicle like e.g. the upper coupling points of the shock absorbers. Said reference basis should in any case be identical with the axis of symmetry of the vehicle, wherein the choice of the reference basis is left to the decision of the vehicle manufacturers which tell about chassis check points for their respective vehicle types.

The gyroscope thus maybe started at a rear wheel, the direction differences of the remaining wheels with respect to this rear wheel are sampled subsequently, stored and finally the stored values are mutally correlated by calculation for finding the wheel alignment parameters.

Alternatively the measurement method consists in starting the gyroscope at a reference basis, sampling the differences in direction of the wheels with respect to said reference basis storing them and thereafter mutually correlating the stored values by calculation.

The initial adjustment of the direction of the reference basis at a wheel or another part of the vehicle preferably is effected thus that in the adjusted direction the angle measurement device issues an output signal "0" so that the amount of the output signals of the angle measurement device during the measurement of the remaining wheels corresponds to the actual deviation of the wheel positions from the initial value.

According to a further preferable feature of the invention it is provided that for carrying out the measurement at the individual wheels the angle measurement device simply is held against the wheel to be measured without being fixed to it. This is possible in case of the present invention in contrast to the known state of art. Only one angle measurement instrument is provided for which can easily be held and subsequently be applied to the wheels by only one operating person.

If a manufacturer of vehicles considers it desirable that the angle measurement device is mounted on or applied to standardized quick-mounting devices the angle measurement instrument of course may also be put on or held to such mounting device. Such mounting device may e.g. act on the wheel mounting base or the brake disks and thus is independent from the shape of the wheel rim.

In the use of a gyroscope as a directionally stable element, the axis of rotation of the gyroscope is directionally stable in space and, as it takes some time to carry out the measurement operations, a drift in the gyroscope axis in horizontal direction will occur due to the rotation of the Earth, such drift increasing more and more during the measurement operation. In case of extremely precise measurements, this drift of the gyroscope axis due to the rotation of the Earth may lead to incorrect measurement results. In a particularly preferable further development of the method of the present invention, it is therefore provided that the measured angles are corrected by the drift correction angle resulting from the rotation of the Earth.

The drift angle depends on the geographic latitude. Since it cannot be foreseen by the manufacturer where the respective wheel alignment measurement system will be used, the drift angle per time unit cannot be determined beforehand by the manufacturer and/or be incorporated in the calculation circuit. Rather the drift angle per time unit must be input in the device in dependence on the respective place of use. For this purpose it would be possible that the user inputs the values corresponding to the respective place of use in the measurement system e.g. by means of a keyboard.

It is, however, provided in a preferable manner that prior to the first measurement at a certain workshop, the drift angle of the measuring basis per time unit is measured and that this drift angle per time unit then is automatically stored in the system.

For calculating the respective drift correction angle preferably the time having elapsed since the adjustment of the direction of the reference basis is measured and is multiplied with the before-measured drift angle per time unit in order to obtain the drift correction angle. Thus in the method according to the present invention the respective drift correction angle is calculated in every single measurement and the measurement result is corrected by said drift correction angle. The calculation of the wheel alignment parameters then is effected on basis of the already corrected angle measurement results.

The wheel alignment measurement apparatus according to the present invention is characterized in that the angle measurement arrangement includes one single angle measurement instrument which is adapted to be coupled to one of the wheels at a time, that as a reference basis for the angle to be measured by means of the angle measurement instrument an element being directionally stable in space independently of its local position like, in particular a gyroscope suspended in cardanic manner, is provided for in the angle measurement instrument and that storage means are provided for for storing the measured angles for each of the wheels.

For direction finding of the angle measurement instrument it is preferably provided that at one front face of the housing of the angle measurement instrument, an adjustment device is provided for adjusting the angle measurement instrument in relation to the wheels to be measured and, if required, additionally to another part of the vehicle.

In preferred further development of the invention the adjustment device is formed by a bar being rigidly connected to the housing of the angle measurement instrument, said bar extending in horizontal direction and being arranged in parallel to the wheel during the measurement. By means of said bar which appropriately can be provided for with shiftable feeler pins, the angle measurement instrument is manually applied to the wheel to be measured. No devices connecting the angle measurement device with the wheel in rigidly fixed or self-supporting manner are required. The arrangement of the gyroscope and the gimbals is expediently chosen such that the axis of the outer gimbal is arranged in vertical direction and that the axis of rotation of the gyroscope during operation is essentially perpendicularly arranged with respect to the wheel to be measured.

As has already been mentioned above, it is meaningful prior to the beginning of the measurement operations, to adjust the directionally stable reference element in such way that the angle measurement device connected thereto issues an output signal "0" in the starting position. For this purpose in further development of the invention, an adjustment means is provided for tilting the outer gimbal with respect to the housing into a starting position in such manner that the axis of rotation of the gyroscope at rest is perpendicular to the reference line defined by the adjustment device, i.e. in perpendicular to the bar.

A particularly simple construction of the angle measurement apparatus results if the angle measurement device is disposed in a concentric position with respect to the axis of the outer gimbal and is coupled to said axis.

The wheel alignment system under the present invention preferably consists of the angle measurement instrument to be carried from wheel to wheel and a display unit which may be disposed stationarily and be connected to the angle measurement instrument by flexible cables. The display unit may have a digital display and/or include a screen; the electronic storage and calculation circuit may also be mounted in the stationary unit.

Further advantageous embodiments of the invention can be seen from the claims as well as from the following description.

In the drawings

FIG. 3 is a side view of the angle measurement instrument of FIG. 2 in direction of the arrow III;

Figure 1:
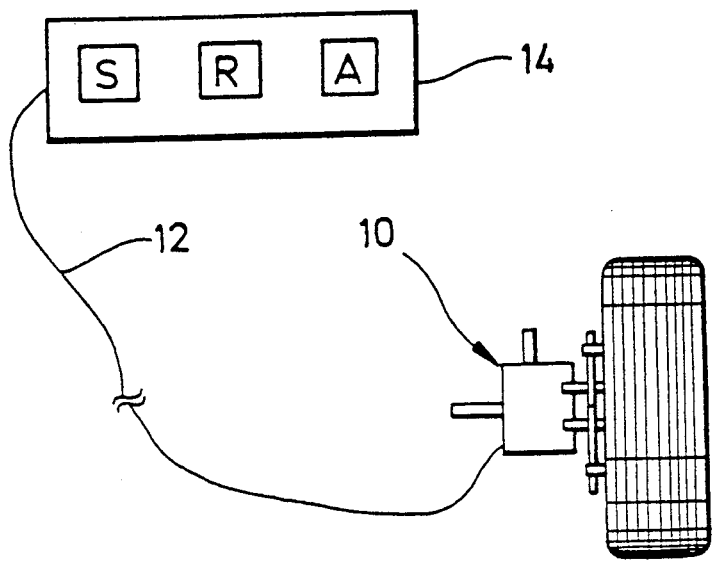
FIG. 1 is a schematic view of the wheel alignment measuring apparatus according to the present invention.

The wheel alignment measurement apparatus shown in FIG. 1 includes a mobile, portable angle measurement device 10 being connected to a stationary unit 14 by means of an electric line 12. The stationary unit 14 includes memories S for storing the measured values measured in the angle measurement device 10, calculation circuits R for calculating the wheel alignment parameters (track values) resulting from the measured values and a display unit A in form of a screen for displaying the calculated wheel alignment parameters, e.g. single track angle, track difference angle and the like.

Figure 2:
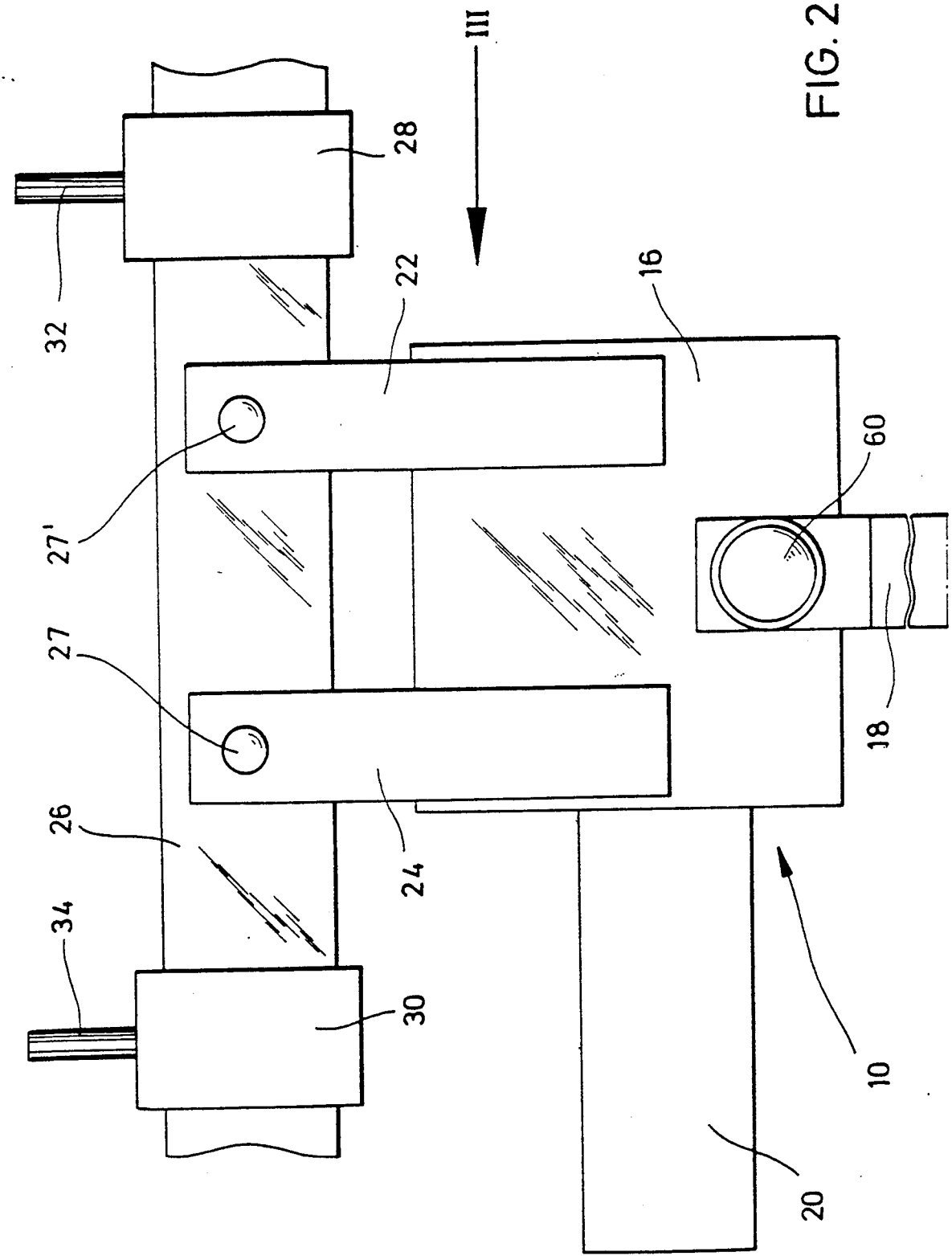
FIG. 2 is a top view of the angle measurement instrument of the wheel alignment measurement apparatus of FIG. 1.

The angle measurement device 10 shown in top view in FIG. 2 includes a housing 16 to which two handles 18, 20 extending in a horizontal plane are fixed which are disposed at right angles to one another. One handle 18 is located at the back face of the housing 16, the other handle is mounted at a side wall of the housing perpendicular to the handle 18. By means of two parallel carrier members 22, 24 a horizontal, i.e. in the drawing plane of FIG. 2, bar 26 is fixed at the front side of the housing 16 parallel thereto by means of bolts 27, 27'. The bar 26 extends in its longitudinal direction beyond the breadth of the housing 16 at both ends and supports at both sides by means of sliding guides 28, 30, being shiftable along the bar 26 and disconnectably fixable thereto, a feeler pin, resp., 32, 34 extending in horizontal direction (in the drawing plane of FIG. 2) to the front perpendicularly to the bar 26.

Being connected to the housing 16 the bar 26 with the shiftably supported feeler pins 32, 34 serves for applying the an angles measurement device 10 to the rim of the wheel to be measured by holding the measuring instrument 10 being manually carried by means of the handles 18, 20, with the feeler pins to the rim.

As is shown in FIG. 3, a gyroscope unit 36 is arranged within the housing 16 of the angle measurement device 10, which unit comprises a gyroscope preferably driven by means of an asynchronous motor 38 and having a rotor axis 40 being aligned basically horizontally during operation. The gyroscope body acts as short-circuit armature for the asynchronous motor 38 and rotates in frictionless manner by means of brushes at a speed of up to 40000 rpm. The gyroscope unit 36 includes an outer gimbal 42 being supported by a vertical axle 44 in bearings 46, 48 formed at the housing and an inner gimbal 50 being supported pivotally about the horizontal axle 52 in the outer gimbal 42. The gyroscope is supported pivotally about the rotation axis 40 in the inner gimbal 50.

Above (line of sight as in FIG. 3) the gyroscope unit 36 in the housing 16 of the angle measurement instrument 10 an angle measurement device 54 is arranged and fixedly connected to the housing 16. As angle measurement device 54 preferably an incremental angle measurement instrument or a rotary potentiometer are used. The axle 56 of the angle measurement device 54 is arranged vertically and coaxially with respect to the axle 44 of the outer gimbal 42. The axle 56 of the angle measurement device 54 is connected to the axle 44 by a coupling 58.

A push button 60 is arranged at the top side of the end of the handle 18 being closer to the housing in such manner that it can easily, in particular with the thumb, be actuated when applying the angle measurement instrument. Upon actuation of the push button 60 the output signal of the angle measurement device 54 is sampled for carrying out the angle measurement and, as will be described later, will be stored.

By means of a knob 62 being in connection with the axle 44 of the outer gimbal 42 the outer gimbal 42 can be adjusted prior to the start of the gyroscope in such manner that the rotation axis 40 of the gyroscope is exactly at a right angle with respect to the bar whereby in this initial position the electric angle measurement device 54 gives an output voltage corresponding to "0" degrees. The ability to set the gyroscope to "0" is particularly advantageous when a potentiometer is used as an angle measurement device, as will be explained in more detail with reference to FIG. zero setting of the gyroscope in the beginning of a measurement may be avoided in case of using a potentiometer. An initial position of the potentiometer other than "0" can be compensated for by RESET circuitry. If a so-called incremental angle measurement device is used as the angle measurement instrument, the zero position is of no importance as such incremental angle measurement devices give the difference in angle between the initial position and a measurement position as an output signal.

Figure 6:
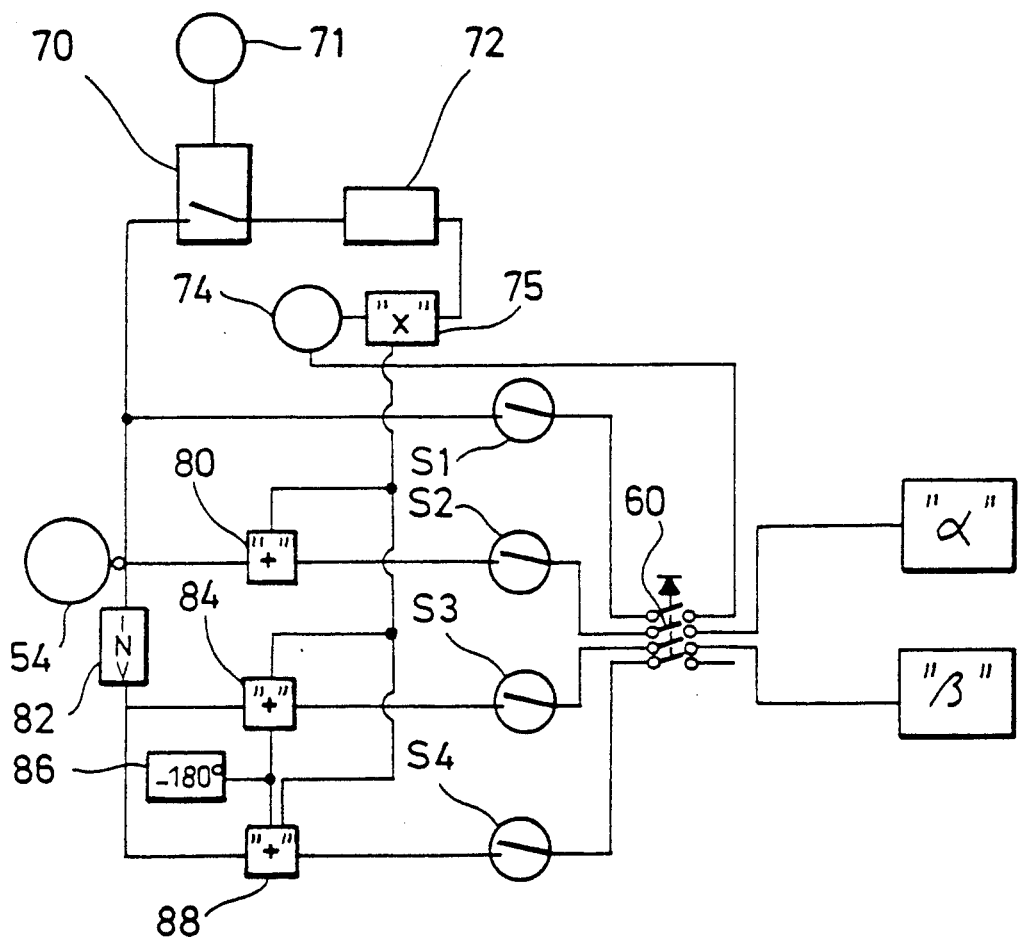
FIG. 6 is a schematic block diagram of a circuit for evaluating the steering angles.

The electronic system preferably located in the unit 14, of the wheel alignment measurement system is to sample and to store the difference in angle between the reference basis and the wheels to be checked and subsequently is to calculatively transform the stored parameters into the actual measurement results which then can be displayed at the display unit A. For this purpose the electronic circuitry is subdivided into essentially three sections, namely a circuit for calculating the drift correction angle, a circuit for sampling and storing the measurement values and a circuit for calculating the measurement results from the stored measurement values. The two firstcited circuits are identical for all embodiments which will be described in the following. Only the circuits for calculating the measurement results differ in FIGS. 4 and 6. The measurements calculated in the circuit of FIG. 4 relate to the track parameters of the vehicle. The measurement results calculated in the circuit of FIG. 6 are parameters relating to the steering angles.

At first the calculation circuit is described by which the drift of the gyroscope with time is calculated. The drift of the gyroscope has to be taken into account since the subsequent applying of the angle measurement instrument to all wheels to be measured, i.e., e.g. to four, six or eight wheels, takes a certain amount of time. As the gyroscope is operated in a direction-stable manner independently from the rotation of the Earth, there will be a change of direction of the axis of the gyroscope with respect to the vehicle during the period of measurement. This phenomenon is known under the term "apparent drift". The value of the drift angle depends on the elapsed time and on the geographic latitude. It is known that the drift angle quite exactly represents 15° times sin $\theta$ per hour in the geographic latitude $\theta$. E.G. at the average latitude of 45°, results a drift angle of 10,6° per hour or 10,6 arc minutes per time minute. To guarantee an exact measurement, therefore, these changes resulting from the apparent drift must be corrected. As the respective installation site of the wheel alignment measurement system is not known, the respectively valid drift angle cannot beforehand be determined by the manufacturer. Therefore, a calculation circuit is provided for which can automatically calculate the correct drift angle. This calculation circuit includes a switch 71 for starting the time-lag relay 70 as well as a memory 72. This calculation circuit is connected to the angle measurement device 54. The angle measurement instrument 10 is connected to or clamped in at a prepared site of the subframe of the unit 14 and the gyroscope is activated. Upon acutation of the switch 71 the angle measurement device 54 during a predetermined period of time, e.g. one minute, measures the angle change occuring due to the rotation of the Earth with respect to the direction of rotation of the gyroscope and inputs this output voltage into the memory 72. Upon the given time having passed, the time-lag relay 70 interrupts the connection between the angle measurement device 54 and the memory 72. The output voltage of the angle measurement device existing at that point of time is preserved in the memory 72 and represents the value for the respective site of use, for the drift angle per time unit. As long as the wheel alignment measurement system remains in the same place, the once found value of the drift angle per time unit is kept selectably stored in the memory 72.

The drift correction angle for the respectively measured angle of a wheel is found in a further calculation circuit in that the drift angle per time unit, stored e.g. in the form of arc seconds per time second, is mutiplied with the time seconds having elapsed since the beginning of the measurement. For this purpose it is provided that simultaneously with the input of the first measurement value into the circuitry during the application of the angle measurement device to the first wheel an electronic time pulse generator 74 (a clock) is started which indicates the time having passed since the beginning of the measurement. In a multiplication circuit 75 the amount of the drift angle per time unit is continuously multiplied with the signal representing the elapsed time in order to calculate the respectively valid drift correction angle which can be sampled at any time without the multiplication being interrupted thereby.

The calculation circuit calculating and storing the basic value for the drift angle per time unit for a particular geographic site of the measurement place as well as the circuit effecting the drift correction during the measurement on basis of said stored value are the same for all circuitries described in the following.

Now the circuitry of FIG. 4 and the function thereof will be described in more detail. Various measuring methods and calculation proceedings are possible for being able to calculate the track of all wheels of a vehicle. The most simple method is that one of the wheels to be measured, preferably the left rear wheel, is declared to be the measurement basis reference. In this case the angle measurement device 10 is held against this wheel and the gyroscope unit 36 is started. As soon as the gyroscope has reached its full speed the time pulse generator 74 is started by pressing the button so that the continuous calculation of the drift correction angle begins.

Thereafter the angle measurement device is subsequently held against the other wheels to be measured and in this manner the difference between the direction of movement of the wheels and the measuring basis is sampled. By pressing the push button 60 the respective output signal of the angle measurement device 54 is added to the then valid value of the drift correction angle and is input into one of the memories M2 to M4 relating to the respective wheel. Till the end of the last measurement the gyroscope runs at full speed. Upon termination of said working steps the calculation of the actual individual or total track parameters as well as the display thereof in the display unit A can be initiated by pressing the program switch "display". The above-described method permits the calculation of the total track of the front wheels, the total track of the rear wheels as well as the individual tracks of the front wheels with respect to the geometrical axis of movement.

For sampling the measuring values upon actuation of the program switch "sample" the selection button "LH" (FIG. 5) is pressed whereby the switch S1 (FIG. 4) is closed and the angle measurement device 10 is applied to the left rear wheel. Upon pressing the push button 60 the time pulse generator 74 begins to run for calculation of the drift correction angle from the product of the elapsed time and the amount of the drift angle per time unit, already stored in the memory 72.

Thereafter the selection button "LV" (FIG. 5) is pressed, whereby the switch S2 (FIG. 4) is closed, and the angle measurement instrument 10 is applied to the left front wheel. Upon pressing the push button 60 the output signal of the angle measurement device 54 and the output signal of the multiplication circuit 75 are fed to an adding circuit 80, are added therein and are stored in the memory M2.

Thereupon the selection button "RV" (FIG. 5) is actuated, whereby the switch S3 (FIG. 4) is closed, and the angle measurement instrument 10 is applied to the right front wheel. Upon pressing the push button 60 now the output signal of the angle measurement device 54 is input into an adding circuit 84 through an inverter 82 together with the output signal of the multiplication circuit 75. In the adding circuit 84 the two output signals are added to a further signal which corresponds to an angle of $-180°$ and is fed to the adding circuit 74 by a correction circuit 86. The input of a correction angle of $-180°$ serves for compensating for the change of position of the angle measurement instrument when it is brought to the other side of the vehicle. The output signal of the adding circuit 84 reaches the memory M3 via the switch S3.

Subsequently the selection button "RH" (FIG. 5) is pressed, whereby the switch S4 (FIG. 4) is closed, and the angle measurement instrument is applied to the right rear wheel. The output signal of the angle measurement device 54 together with the output signal of the multiplication circuit 75 and the output signal of the correction circuit 86 is fed to an adding circuit 88 in which the input signals are added. The output signal of the adding circuit 88 reaches the memory M4 via the switch S4.

Thus, upon termination of the measurement the measuring values realting to the left and right front and right rear wheels of the vehicle are stored in the memories M2 to M4.

Figure 5:
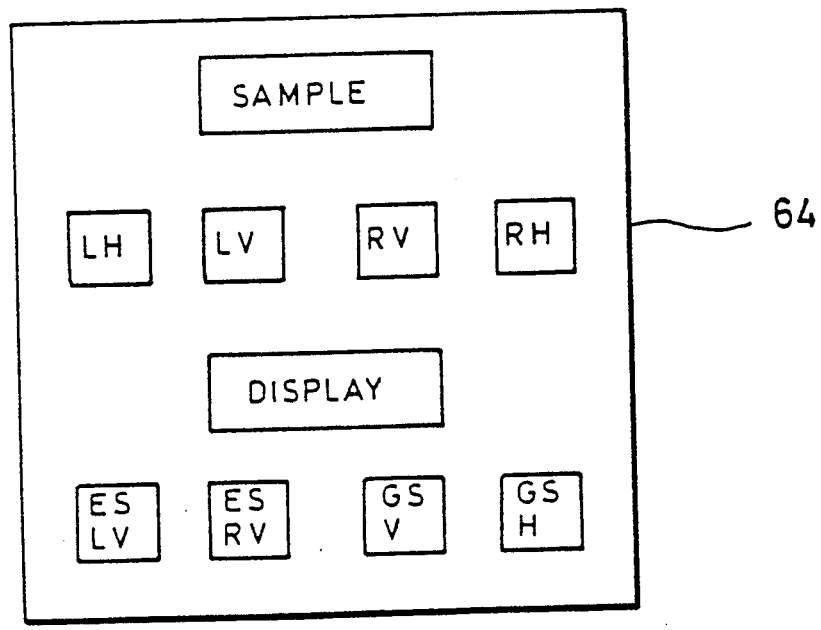
FIG. 5 is a switchboard of the stationary unit of the wheel alignment measurement apparatus.

FIG. 5 shows in which way one program switch each is provided for in the unit 14 for the detection and storage of the measuring values on one hand and for the calculation of the track parameters and the display on the other hand. A switch board comprising said program switches further includes one button for each wheel, which button by means of its name points to the respective wheel to be measured. The switch board 64 (FIG. 5) has the buttons "LH" for left rear wheel, "LV" for left front wheel, "RV" for right front wheel and "RH" for right rear wheel.

Upon switching over the program switches in FIG. 5 to "Display" the track parameters are calculated out of the corrected values stored in the memories M2 to M4. In the circuit of FIG. 4 it is started on the assumption that the angle measurement device 54 upon application to the left rear wheel has the value "0" if a potentiometer is used. As the measuring value for the left rear wheel thus is zero, it does not effect the calculation of the track parameters. The total track angle of the front wheels GSV (FIG. 4) is found by adding the output signals of the memories M2 and M3 in the adding circuit 90. The total track angle of the rear wheels GSH is the output signal of the memory M4. The single track angles of the front wheels are related to the geometrical axis of movement. The single track angle of the left front wheel ESLV is found by dividing the output signal of the memory M4 by two in the dividing circuit 94 and by adding the output signal of the dividing circuit 94 to the output signal of the memory M2 in the adding circuit 96. The single track angle of the right front wheel ESRV is found by dividing the output signal of the memory M4 by two in the dividing circuit 94 and by subtracting the output signal of the dividing circuit 94 from the output signal of the memory M3 in the subtraction circuit 98. The program switch "Sample" in FIG. 5 is correlated to the buttons "LH" for "left rear wheel", "LV" for "left front wheel", "RV" for "right front wheel", "RH" for "right rear wheel". The program switch "Display" is correlated to the buttons "ELV" for "single track angle of left front wheel", "ERV" for "single track angle of right front wheel", "GSV" for "total track angle of front wheels" and "GSH" for "total track angle of rear wheels". The parameters "GSV", "GSH", "ESLV" and "ESLR" can be displayed in a respective display field of the switch board 64 in the unit 14.

In FIG. 6 is shown in which way the angle measurement instrument 10 and the circuitry from the angle measurement device 54 to the push button 60 can also be used for sampling and displaying the steering angles of the steerable wheels of the vehicle by combining the output values of the angle measurement device 54 and the multiplication circuit 75. The steering angles are, e.g., required for finding the track differential angles, the maximum steering angle and for displaying certain angles which form the basis for calculating the castor and the king pin inclination.

For determination of the steering angle of the front wheels the reference basis for the measurement preferably is the front wheel which is to be set to 20° by the steering movement, e.g. during the measurement of the track differential angle. At first the wheel is set to "travel straight ahead" and upon application of the angle measurement device 10 to said wheel the push button 60 is pressed and the switch S1 is closed, whereupon the calculation of the drift correction angle is started. Then the switch S2 is closed and the steering wheel is turned wherein the steering angle α is continuously displayed in the display field so that the operating person can continuously check the steering angle. When the wheel is at 20° the angle measurement instrument is changed in position to the other front wheel, the switch S3 is closed, so that the steering angle β of the other wheel is measured and displayed. The difference of the angles α and β is the track differential angle. In corresponding manner it is also possible to measure the maximum steering angle and the like. It may be provided for in the measurement of the wheel steering angle that the angle measurement instrument is mounted on holding fixtures at the respective wheels so that the system may be operated by one operating person. Otherwise one operating person would have to turn the steering wheel, whereas the other operating person holds the measurement instrument against the wheel. Since the push button 60 must remain closed during the wheel lock to ensure that a continuous display can be effected, the push button 60 may be lockable in the closed position for this measurement. Like in the above-described track measurement the drift correction angle and the factors resulting from the change of side of the angle measurement instrument 10 are calculated in the electronic circuitry.

I claim:

1. A method for measuring wheel alignment comprising:
    engaging a measuring assembly with a wheel, said measuring assembly having a gyroscope, a wheel engaging member, a cardanic joint coupling said wheel engaging member to said gyroscope and angle measurement means adapted to provide electrical signals indicative of the angles of said cardanic joint relative to said gyroscope and wheel engaging member;
    storing said angles in a storage means in response to said electrical signals;
    engaging said measuring assembly with subsequent wheels and storing subsequent angles in said storage means; and
    calculating the wheel alignment parameters in response to the stored angles.

2. A method under claim 1, wherein the angle measurement apparatus is held against a rim of the wheel to be measured.

3. A method under claim 1, wherein the direction of the gyroscope at first is adjusted at one of the wheels, preferably a rear wheel, and thereafter remains unchanged till the end of the measurement.

4. A method under claim 1, wherein the direction of the gyroscope at first is adjusted at a selected part of the vehicle, and thereafter remains unchanged till the end of the measurement.

5. A method under claim 1, wherein the gyroscope at first is at rest for adjusting the direction of the reference basis, is spun up and is kept rotating till termination of the measurement.

6. A method under claim 5, wherein the measured angles are corrected by the drift correction angle resulting from the earth's rotation by measuring, prior to the first measurement at a given workshop, the drift angle of the gyroscope per time unit and storing the drift angle readably, and by measuring, during the measurement, the time having elapsed since the adjustment of the direction of the gyroscope and multiplying the elapsed time with the drift angle per time unit measured before.

7. A method under claim 5, wherein the direction of the gyroscope at first is adjusted at one of the wheels, preferably a rear wheel, and thereafter remains unchanged till the end of the measurement.

8. A method under claim 5, wherein the direction of the gyroscope at first is adjusted at a selected part of the vehicle, and thereafter remains unchanged till the end of the measurement.

9. A wheel alignment measurement apparatus comprising:
    a measuring assembly having a gyroscope, a wheel engaging member, a cardanic joint coupling said wheel engaging member to said gyroscope and an angle measurement means adapted to provide electrical signals indicative of the angles of said cardanic joint relative to said gyroscope and wheel engaging member, said measuring assembly being engageable with successive wheels;
    storage means for storing the angles of said cardanic joint in response to said electrical signals; and
    a calculation circuit for determining wheel alignment parameters from said stored angles.

10. A wheel alignment measurement apparatus under claim 9, wherein at a front face of housing of the angle measurement instrument, an adjustment device is provided for adjusting the angle measurement instrument in relation to the wheels to be measured and, if required, additionally to a selected part of the vehicle.

11. A wheel alignment measurement apparatus under claim 10, wherein the adjustment device comprises a bar rigidly connected to the housing of the angle measurement instrument.

12. A wheel alignment measurement apparatus under claim 11, wherein feeler pins are shiftably arranged on the bar.

13. A wheel alignment measurement apparatus under claim 9, wherein an axis of an outer gimbal of said gyroscope is arranged vertically, the axis of rotation in the gyroscope being basically perpendicularly arranged with respect to the wheel to be measured during operation of the gyroscope.

14. A wheel alignment measurement apparatus under claim 9, wherein at a front face of the housing of the angle measurement instrument, an adjustment device is provided for adjusting the angle measurement instrument in relation to a selected part of the vehicle.

15. A wheel alignment measurement apparatus under claim 14 wherein the adjustment device comprises a bar rigidly connected to the housing of the angle measurement instrument.

16. A wheel alignment measurement apparatus under claim 15, wherein feeler pin are shiftably arranged on the bar.

17. A wheel alignment measurement apparatus under claim 14, wherein an adjustment means is provided for tilting the outer gimbal in relation to the housing into a starting position in such manner that the axis of rotation of the gyroscope at rest is perpendicular to the reference line defined by the adjustment device.

18. A wheel alignment measurement apparatus under claim 9, wherein an angle measurement device of the angle measurement instrument is arranged concentrically with respect to the axis of the outer gimal of the gyroscope and is coupled to said axis.

19. A wheel alignment measurement apparatus under claim 9, wherein the angle measurement instrument further comprises two handles and a push button for initiating the measurement arranged close to the grip of one of the handles.

20. A wheel alignment measurement apparatus under claim 9, further comprising a storage means for storing the respective measured angles.

21. A wheel alignment measurement apparatus under claim 9, further comprising a calculation circuit for determining the drift angle per time unit, resulting in gyroscope from the rotation of the Earth, a memory for storing the drift angle per time unit, a calculation circuit for calculating the drift correction angle valid for the respective measurement and a calculation circuit for correcting the respective measured angle by the respective drift correction angle valid at the time of measurement.

22. A wheel alignment measurement apparatus under claim 21, wherein the calculation circuit for determining the drift angle per time unit includes a time-lag relay for measuring the change of the output signal of the angle measurement device during a given period of time.

23. A wheel alignment measurement apparatus under claim 21, wherein the calculation circuit for calculating the drift correction angle valid for the respective measurement comprises an electronic clock for measuring the time having elapsed since starting the measurement and a multiplication circuit for multiplying the elapsed time with the stored drift angle per time unit.

* * * * *

UNITED STATES PATENT AND TRADEMARK OFFICE
CERTIFICATE OF CORRECTION

PATENT NO. : 5,038,485

DATED : August 13, 1991

INVENTOR(S) : Osmond Beissbarth

Figure 4:
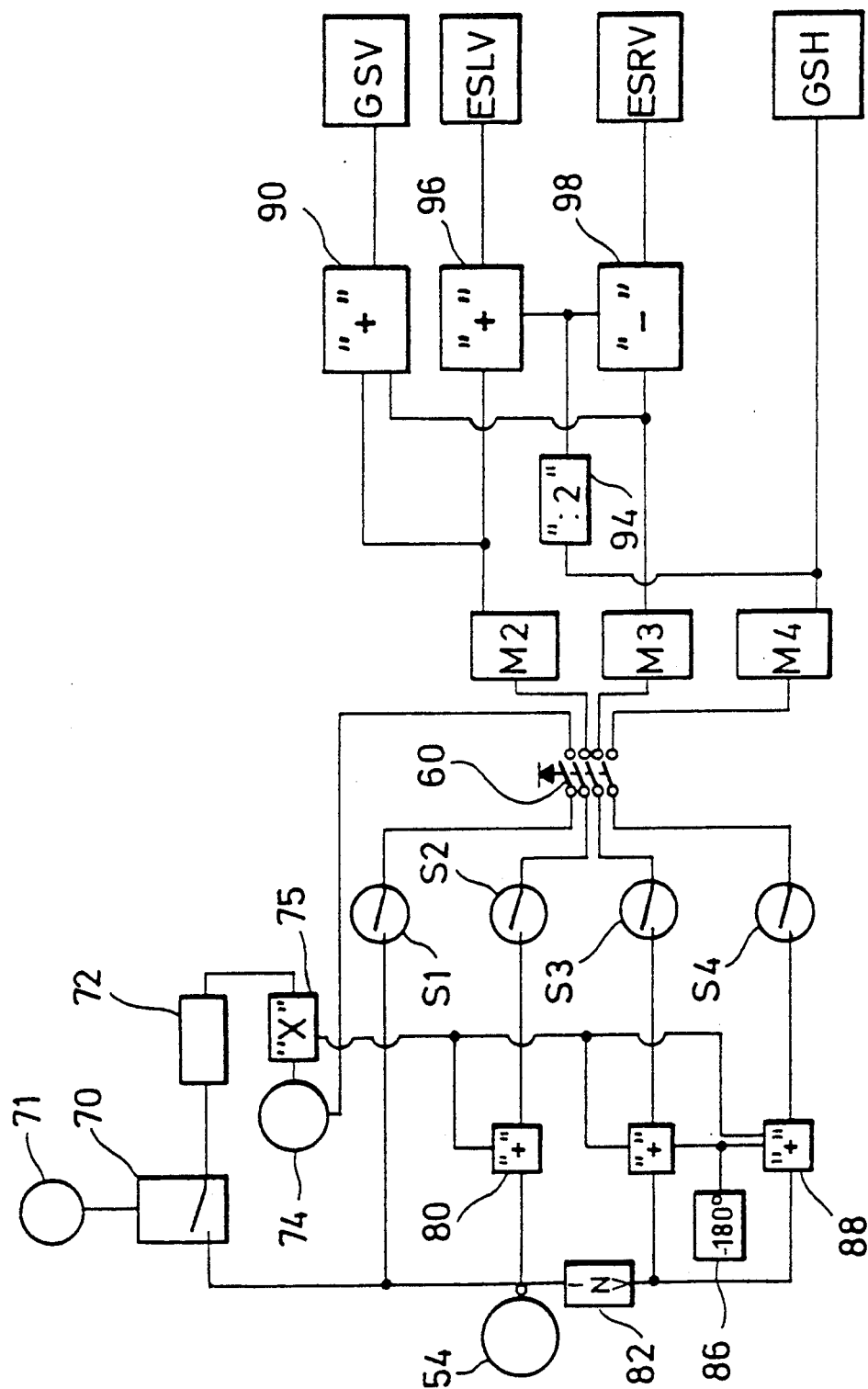
FIG. 4 is a schematic block diagram of the circuit for determining the track parameters.

It is certified that error appears in the above-identified patent and that said Letters Patent is hereby corrected as shown below:

Column 5, line 65 "to FIG. zero setting" should be --to FIG. 4. However, the zero setting--.

Column 12, lines 13-14 "resulting in gyroscope from" should be --resulting in the gyroscope from--.

Signed and Sealed this

Ninth Day of February, 1993

Attest:

STEPHEN G. KUNIN

*Attesting Officer*   Acting Commissioner of Patents and Trademarks